(12) United States Patent
Teale et al.

(10) Patent No.: US 12,505,454 B2
(45) Date of Patent: Dec. 23, 2025

(54) PACKAGING COMPLIANCE METHOD

(71) Applicant: Kilcoy Pastoral Company Limited, Birtinya (AU)

(72) Inventors: Jarrod Teale, Birtinya (AU); Nigel Adler, Birtinya (AU)

(73) Assignee: Kilcoy Pastoral Company Limited, Birtinya (AU)

( * ) Notice: Subject to any disclaimer, the term of this patent is extended or adjusted under 35 U.S.C. 154(b) by 175 days.

(21) Appl. No.: 18/281,587

(22) PCT Filed: Mar. 16, 2022

(86) PCT No.: PCT/AU2022/050229
§ 371 (c)(1),
(2) Date: Sep. 12, 2023

(87) PCT Pub. No.: WO2022/192951
PCT Pub. Date: Sep. 22, 2022

(65) Prior Publication Data
US 2024/0161124 A1    May 16, 2024

(30) Foreign Application Priority Data

Mar. 17, 2021    (AU) ............................... 2021900779
Aug. 24, 2021    (AU) ............................... 2021221554

(51) Int. Cl.
*G06Q 30/018*    (2023.01)
*A22C 17/00*    (2006.01)
(Continued)

(52) U.S. Cl.
CPC ....... *G06Q 30/018* (2013.01); *A22C 17/0093* (2013.01); *A22C 17/10* (2013.01);
(Continued)

(58) Field of Classification Search
CPC .. G06Q 30/018; G06Q 10/08; G06Q 10/0833; G06Q 10/0832; G06Q 10/087;
(Continued)

(56) References Cited

U.S. PATENT DOCUMENTS

| 8,428,773 B1 | 4/2013 | Carr et al. |
| 10,902,051 B2 | 1/2021 | Hu et al. |

(Continued)

FOREIGN PATENT DOCUMENTS

| EP | 3267368 A1 | 1/2018 |
| WO | 2007045848 A1 | 4/2007 |
| WO | 2020124247 A1 | 6/2020 |

OTHER PUBLICATIONS

• Mainetti et al. "An Innovative and Low-Cost gapless traceability system of fresh vegetable products using RF Technologies and EPCglobal standard", Computers and Electronics in Agriculture, http://dx.doi.org/10.1016/j.compag.2013.07.015, pp. 146-157, Jul. 28, 2013 (Year: 2013).*

(Continued)

*Primary Examiner* — James D Nigh
(74) *Attorney, Agent, or Firm* — Vedder Price P.C.

(57) ABSTRACT

A packaging compliance method comprising:
  associating a packaging label having a unique first digitally readable element with a unique record in a database; the unique record in the database containing information about an item of produce;
  applying the packaging label directly to the item of produce or packaging containing the item of produce;
  packing two or more items of produce into a container having a container label; the container label having a container digitally readable element to determine the required items of produce that should be located within the container;

(Continued)

reading all of the unique first digitally readable elements located within the container to obtain the information from the unique records associated with the unique first digitally readable elements;

reading the container digitally readable element to obtain information on the required items of produce that should be located within the container;

comparing the information from the unique records associated with the read unique first digitally readable elements and information of the required items of produce that should be located within the container to determine if the container contains the required items of produce;

rejecting the container if the container does not contain the required items of produce to complete packaging compliance.

14 Claims, 1 Drawing Sheet

(51) Int. Cl.
| | |
|---|---|
| A22C 17/10 | (2006.01) |
| B65C 11/02 | (2006.01) |
| G06K 1/22 | (2006.01) |
| G06K 7/10 | (2006.01) |
| G06K 19/06 | (2006.01) |
| G06K 19/063 | (2006.01) |
| G06K 19/07 | (2006.01) |
| G06K 19/077 | (2006.01) |
| G06Q 10/0639 | (2023.01) |
| G06Q 10/08 | (2024.01) |
| G06Q 10/083 | (2024.01) |
| G06Q 10/0832 | (2023.01) |
| G06Q 10/0833 | (2023.01) |
| G06Q 10/087 | (2023.01) |
| G06Q 50/02 | (2024.01) |

(52) U.S. Cl.
CPC .......... *B65C 11/02* (2013.01); *G06K 7/10237* (2013.01); *G06K 19/06009* (2013.01); *G06K 19/07758* (2013.01); *G06Q 10/06395* (2013.01); *G06Q 10/08* (2013.01); *G06Q 10/083* (2013.01); *G06Q 10/0833* (2013.01); *G06Q 10/087* (2013.01); *G06Q 50/02* (2013.01); *G06K 1/22* (2013.01); *G06K 19/06037* (2013.01); *G06K 19/063* (2013.01); *G06K 19/0723* (2013.01); *G06Q 10/0832* (2013.01)

(58) Field of Classification Search
CPC .......... G06Q 10/06395; G06Q 10/083; G06Q 50/02; G06K 19/06037; G06K 19/0723; G06K 19/06009; G06K 19/07758; G06K 19/063; G06K 1/22; G06K 7/10237; G06K 19/060037; A22C 17/10; A22C 17/0093; B65C 11/02
USPC ........................................................ 705/317
See application file for complete search history.

(56) References Cited

U.S. PATENT DOCUMENTS

| | | | |
|---|---|---|---|
| 2009/0242631 | A1 | 10/2009 | Wishnatzki |
| 2014/0343719 | A1 | 11/2014 | Collombet et al. |
| 2016/0189020 | A1* | 6/2016 | Duckett ............ G06K 5/00 235/462.01 |
| 2018/0068139 | A1 | 3/2018 | Aalund et al. |
| 2018/0157873 | A1* | 6/2018 | Roth ............ G06K 7/10128 |
| 2018/0157876 | A1 | 6/2018 | Chai et al. |
| 2019/0080128 | A1 | 3/2019 | Evans et al. |
| 2019/0156086 | A1* | 5/2019 | Plummer ............ H04N 23/45 |
| 2020/0074254 | A1 | 3/2020 | Masood et al. |
| 2020/0311666 | A1* | 10/2020 | Gray ............ G06F 16/1824 |

OTHER PUBLICATIONS

• Wang et al. "Verifiable Smart Packaging with Passive RFID", IEEE Transactions on Mobile Computing, vol. 18, No. 5, May 2019, pp. 1217-1230 (Year: 2019).*

• Cortes-Murcia et al. "Supply Chain Management, Game-Changing Technologies, and Physical Internet: A Systematic Meta-Review of Literature", IEEE Access, vol. 10, Jun. 15, 2022, pp. 61721-61743 (Year: 2022).*

International Search Report and Written Opinion filed in PCT/AU2022/050229 dated May 5, 2022; 10 pages.

European Search Report filed in EP App. No. 22770079.6/PCT/AU2022050229 dated Jan. 14, 2025; 10 pages.

* cited by examiner

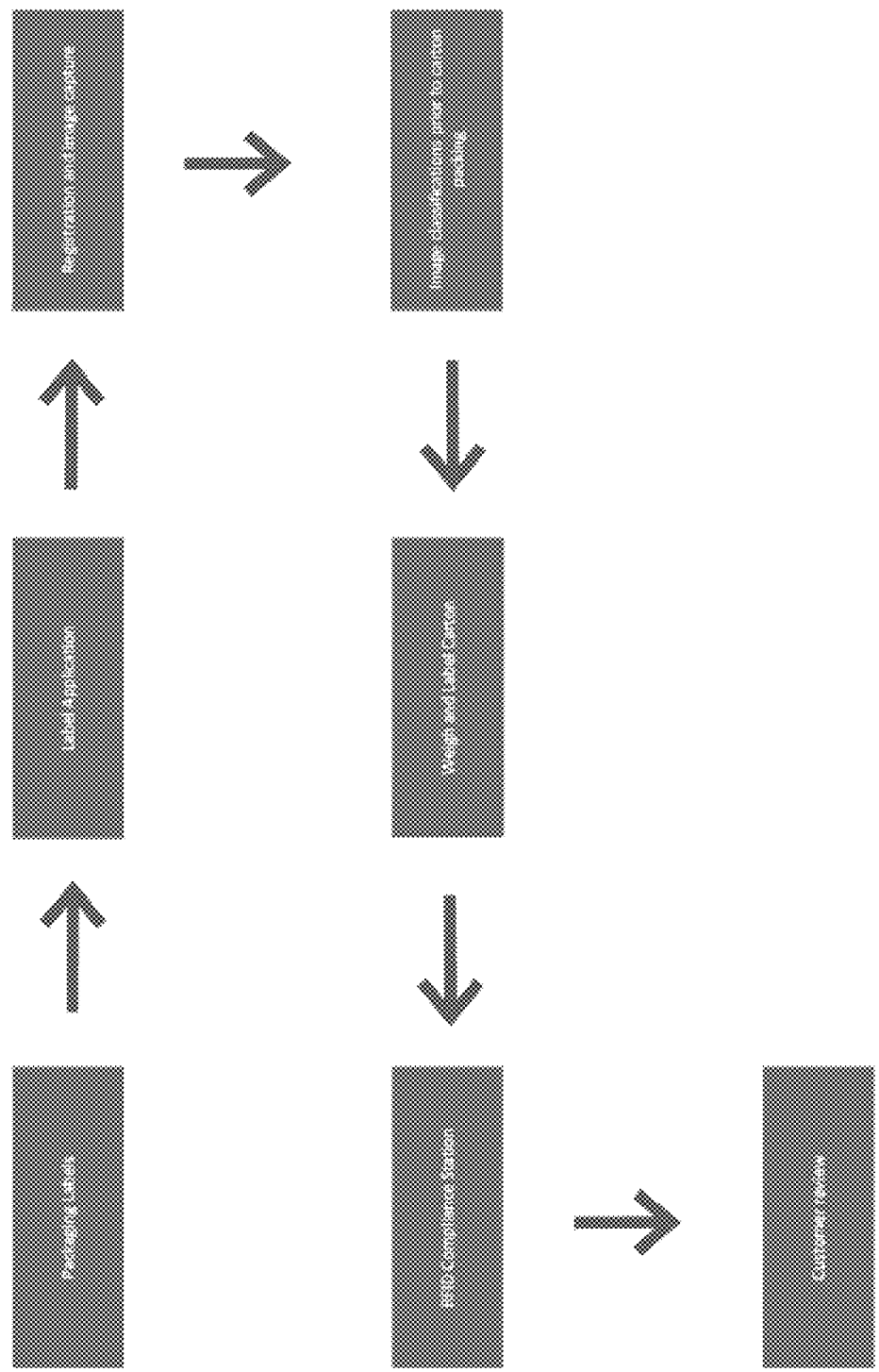

PACKAGING COMPLIANCE METHOD

FIELD OF THE INVENTION

This invention relates to a packaging compliance method. In particular, the invention relates to a packaging compliance method in the meat industry and therefore, will be described in this context. However, it should be appreciated that the packaging compliance method may be used in other industries.

BACKGROUND OF THE INVENTION

The meat industry has many stringent regulations that must be adhered to safeguard consumers. These regulations vary slightly from country to country. When exporting meat from one country to another country, the country that purchases the meat typically determines the regulations that must be adhered to. If the regulations are not met, then the importing country can reject some or all of the shipment. This is obviously not desirable from the exporter's perspective.

One of the most basic requirements in the meat industry is what is marked on the outside of the box must be located within the box. For example, if the box indicates there are twelve beef tenderloins in the box, the box must contain twelve beef tenderloins. In theory, this appears to be relatively easy to achieve. However, large scale abattoirs can process over 1500 cattle per day, over 10,000 sheep per day and employ over 2000 people.

With processing and packing of meat largely relying on human capital, this can lead to mistakes being made given the large volume of meat that is processed daily. These errors can include the wrong type of meat being located within a packet, not having the required number of cuts within a box or the wrong cuts located within the box. A small number of errors can lead to the rejection of an entire shipment that can cause substantial economic and reputational damage to an abattoir. However, it is difficult to remove human error in such a human capital intensive operation.

Object of the Invention

It is an object of the invention to overcome and/or alleviate the abovementioned problems and/or provide the consumer with a useful or commercial choice.

SUMMARY OF THE INVENTION

In one form, although not necessarily the only or broadest form, the invention resides in a packaging compliance method comprising:
 associating a packaging label having a unique first digitally readable element with a unique record in a database; the unique record in the database containing information about an item of produce;
 applying the packaging label directly to the item of produce or packaging containing the item of produce;
 packing two or more items of produce into a container having a container label; the container label having a container digitally readable element to determine the required items of produce that should be located within the container;
 reading all of the unique first digitally readable elements located within the container to obtain the information from the unique records associated with the unique first digitally readable elements;
 reading the container digitally readable element to obtain information on the required items of produce that should be located within the container;
 comparing the information from the unique records associated with the read unique first digitally readable elements and information of the required items of produce that should be located within the container to determine if the container contains the required items of produce;
 rejecting the container if the container does not contain the required items of produce to complete packaging compliance.

The first digitally readable element may comprise an RFID tag. The RFID tag may be a passive RFID tag. The RFID tag may be a herringbone RFID tag.

The packaging label may include a second digitally readable element. The second digitally readable element may be unique. The second digitally readable element may comprise a barcode. The barcode may be a 2D barcode. The 2D barcode may be a QR code.

A unique second digitally readable element may be associated with a record in the database. Normally the unique second digitally readable element may be associated with the same unique record in the database as the unique first digitally readable element.

A unique first digitally readable element and/or a unique second digitally readable element may be printed on the packaging label. Alternatively, the unique first digitally readable element and/or unique second digitally readable element may be embedded within the packaging label. Preferably the unique first digitally readable element and the unique second digitally readable element are of different forms.

An encoding device may be used to encode a first digitally readable element with a unique code to make the unique first digitally readable element. The unique code may be a serial number. The encoding device may cause a unique record to be created in a database in a computer system that includes the unique code. The unique record may be uniquely based on the unique code.

The encoding device may read the unique code from the unique first digitally readable element. A comparison of the read code of the first digitally readable element may be compared to the unique code of located within the unique record located within the database to determine if the encoding of the first digitally readable element was successful.

Images of the produce may be taken to and stored against the unique record in the database with the associated unique code of the unique first digitally readable element on the packaging label.

Images of the produce may be passed through a machine learning algorithm, to classify the image into a type of produce. The machine learning algorithm may make a prediction as to the type of produce located in the image. The predicted type of produce may be compared to the type of produce in the unique record associated with the packing label. When the predicted type of produce and the type of produce in the unique record associated with the packing label do not match, the produce and packing label may be marked for further review and/or rejection. The further review may comprise manually checking the produce.

Further features of the invention will become apparent from the detailed description below.

BRIEF DESCRIPTION OF THE DRAWINGS

An embodiment of the invention will be described, by way of example only, with reference to the accompanying FIGURES in which:

FIG. 1 is a schematic representation of a packaging method according to a first embodiment of the invention.

DETAILED DESCRIPTION OF THE PREFERRED EMBODIMENTS

FIG. 1 shows a schematic representation of a packaging method for packaging cuts of meat are accurate are delivered to a purchaser with the required parameters. Further, the method allows the purchaser and exporter to authenticate the cut of meat.

Packaging Labels

The first step in the packing process is to produce a series of blank, printable packaging labels. The packaging labels are made from paper. However, it would be appreciated by a person skilled in the art that the packaging label can be made from other materials that are synthetic based. Each packaging label is blank on its front face and has an adhesive back. A herringbone RFID tag is inlaid into the packaging label. Each packaging label begins with its respective RFID tags being uncoded.

A series of printers are connected to a computer system which houses a database. The printer and computer system are connected and can communicate data between the computer system and the printer and visa-versa Each packaging label passes through a printer before it is used. The printer is controlled by labelling software such as BarTender®. It would be appreciated that the labelling software can be housed in the printer, in a computer system separate to the printer and the computer system that houses the database or in the same computer system that houses the database.

When a packaging label is passed through a printer, the printer prints product identification elements such as the name of the cut of meat, and production date on the front face of the packaging label. It would be appreciated by a person skilled in the art that there can be any number of packaging label templates that can be printed on the packaging label depending on the customer and market access requirements. The product identification elements and packaging label templets are all controlled by the labelling software.

A 2D barcode in the form of a QR code is also printed onto the front face of the packaging label which is also controlled by the labelling software. This QR code has a system-generated universally unique identifier (UUID) which is embedded along with a website prefix to form a web link which will be discussed below. The UUID is also captured in the record of the specific packaging label.

When the packaging label is printed by the printer, the RFID tag is encoded with a unique serial number which is determined by the labelling software. The identification elements of the packaging label also have the serial number of the RFID tag printed onto the packaging label. Once an encoding attempt of the RFID tag has been completed, the serial number of the RFID tag is then read by the printer.

If the read serial number matches the serial number provided to it by the labelling software, then a record in the database is created. This record will contain the product elements located on the label, the UUID and the serial number of the RFID tag and the date and time that the label was printed.

If the serial number in the record in the database does not match the serial number allocated to it by the labelling software, this indicates that the encoding of the RFID tag also failed. The packaging label is then marked with a strikethrough by the printer rather than normal identification elements. The packaging label is then discarded and no associated record is created in the database.

Label Application

Once the labels are printed, and the RFID serial numbers and UUID have been associated with a record, the set of packaging labels with identification elements relating to a particular cut of meat are delivered to a relevant table in a boning room for that cut of meat. As a specific cut of meat is made from a carcass, the boning operator places the cut of meat in a bag and affixes a packaging label to the bag. The bag cut of meat then passes through the sealing process, which vacuum seals the bag and passes the bag through a hot wash to shrink the overage of the bag.

Registration and Image Capture

Follow the sealing process, the packed cut of meat passes through a registration and image capture station. This registration is made up of RFID readers, and cameras focused on the primal pieces. As a cut of meat passes by registration station, the RFID serial number is read from the packaging label using the RFID readers. Images are taken by the cameras from multiple angles of the cut of meat, e.g. directly overhead and offset latterly. The RFID serial number is used to identify the record in the database.

The QR code is read from the photo images from the label obtain to get the UUID. The read UUID is checked against the UUID associated with the record identified by the scanned RFID serial number to determine is the UUID is correctly associated with the record.

When the RFID tag is scanned, the record is updated with which registration station the scan took place. In the database, this RFID serial number is now marked as "active". An active status indicates that the serial number has been encoded on an RFID tag and that packing label has been applied to a cut of meat.

The images captured of the cut of meat are stored against the record in the database with the associated serial number of the RFID tag and UUID on the packaging label. Processing of the images is done using an OpenCV platform, to allow images to be excluded that are not of a sufficient quality standard (e.g. multiple pieces in shot/poor definition of product).

Image Classification

When a packaging label is applied to the bag, there is a risk that a packaging label with incorrect product identification elements was used. All images are passed through a machine learning algorithm, that leverages commercially available processing algorithms from major cloud providers such as Amazon Web Services and Microsoft Azure (e.g. SageMaker) to classify the picture into a type of meat cut. Through this assessment, the machine learning algorithm is able to make a prediction as to the cut of meat that is within the image. The predicted cut of meat is compared to the type of the cut of meat in the record associated with the label. This comparison assists in identifying incorrectly applied labels.

When an incorrect packaging label is identified, the computer system is used to activate an audible and visual alert to stop the packing of that cut of meat piece and send it for further review which may include relabelling/rework.

Weigh and Label Carton

After passing through the registration and image capture station, the packaged meat cuts with associated packaging labels are placed into logistics cartons for storage, chilling and sale/shipping. Multiple pieces of the same cut type are placed manually into a carton, and then this carton is weighed and labelled at labelling and weighing stations. When a carton is sent through for weighing and labelling, the carton information is also sent to the database. A carton label contains information such as product information such as the global trade item number (GTIN), production date, number of pieces and product weight. This information is associated with a bar code located on the carton label. The carton label is printed on a printer which is controlled by logistics software. The logistics software may be located on the same or separate computer system as the database.

RFID Compliance Station

Each carton passes through a compliance check station to check that the information on the carton label matches the cuts of meats inside the carton. The compliance check station comprises of several RFID scanners, both above and below the carton. Normally there are two or three RFID scanners located above the carton and two or three RFID scanners located below the carton, as closely located to the centreline of the carton as possible, and with minimal clearance between the scanner and the respective carton top or carton bottom.

As a carton passes through the compliance check station, a barcode scanner reads the barcode of the carton label. The RFID scanners begin to scan all of RFID serial numbers of all of the RFID tags located within the carton as the carton enters the compliance check station.

While scanning, the RFID scanners are configured to search for all RFID tags within the carton in the compliance check station. As an RFID tag is read, a reciprocal signal is sent to the RFID tag to suppress any further communication while in the compliance check station. In this way, RFID tags that are located in more difficult to read locations within the carton (e.g. underneath more meat) are given a greater chance of communicating with the RFID scanners.

As the carton leaves the compliance check station, all of the serial numbers of the RFID tags read from within the carton, and the information obtained from carton barcode is sent through to the database on the computer system for processing.

The processing is performed through a rules engine that operates initially on the information supplied by the carton label. The rules located within the rules engine are applied to information contained in the database to ensure packaging compliance. This ruleset can be added to or changed over time. Rules that ensure packaging compliance can include:

- Piece count—the count of the RFID tags in the carton scan matches that printed on the carton label.
- Piece active—All the RFID tags have been marked as active at a registration station prior to being scanned at the labelling and weigh stations.
- Piece type—all of the product information relating to meat cut in the record in the database associated with the RFID tag matches that of the carton label (e.g. all are the same type of cut of meat and retention type—Chilled or Frozen).
- Date check—all of the product information relating to a production date in the record in the database associated with the RFID tag matches that of the carton label.

The chosen business rules are assessed automatically in real-time as the carton is exiting the compliance check station prior to arriving at a reject station. If any of these rules fail it indicates non-compliance, i.e. a fail, and the carton is tagged in the database as a reject. This reject designation is supplied by the computer system to a production system with reference to the specific carton. The production system, having been informed that the product is a reject, physically removes the carton from production.

An operator is informed by way of a message on the production screen as to which business rule has failed and therefore what rework action may be required to ensure compliance.

Customer Review—QR Verification

Once the QR code is associated with a record in the database, the QR can be used to access the record. This is useful from a customer's perspective. Through scanning the QR code on an electronic scanning device, such as a mobile phone, a weblink is available. This web link is associated with a website site that is connected to the database via the internet. As the QR code has the UUID for the label associated with that individual cut of meat embedded within, the website produces a page that shows the customer the information about the cut of meat such as:

- Cut name and other product information;
- Provenance information showing the cut came from a particular factory;
- Production date; and
- Photos of the cut of meat The scan information is also captured back on the respective record in the database to show that the label associated with the cut of meat has been QR scanned. This scan information may be used for identifying any counterfeit and grey market activity, through analysis of frequency and source location of the scans.

If the UUID is unable to be read, then a message is displayed indicating that the fact.

Through the solution described above, it can be asserted that the correct label is on the individual cuts of meat, and the correct meat cuts are in the carton and that all packaging label information on the meat cuts and cartons are aligned. Further, information about a sealed package containing meat and having a packaging label can be viewed from any destination throughout the world that has access to the internet.

In this specification, the terms "comprise", "comprises", "comprising" or similar terms are intended to mean a non-exclusive inclusion, such that a system, method or apparatus that comprises a list of elements does not include those elements solely, but may well include other elements not listed.

In this specification, terms such as upward, downward, horizontal and vertical, and their grammatical derivatives, are used to describe the invention in its normal orientation and are not to be construed to limit the invention to any particular orientation.

The reference to any prior art in this specification is not, and should not be taken as, an acknowledgement or any form of suggestion that the prior art forms part of the common general knowledge.

It should be appreciated that various other changes and modifications may be made to the embodiments described without departing from the spirit or scope of the invention.

The invention claimed is:

1. A packaging compliance method comprising:
    associating a packaging label having a unique first digitally readable element with a unique record in a database; the unique record in the database containing information about an item of produce;
    encoding the first digitally readable element with a unique code using an encoding device to make the unique first digitally readable element;
    applying the packaging label directly to the item of produce or packaging containing the item of produce;
    taking at least one image of the produce and storing the at least one image against the unique record in the database with the associated unique code of the unique first digitally readable element on the packaging label;

passing the at least one image of the produce through a machine learning algorithm, to classify the image into a type of produce and the machine learning algorithm making a prediction as to the type of produce located in the at least one image;

comparing the predicted type of produce to the type of produce in the unique record associated with the packing label and when the predicted type of produce and the type of produce in the unique record associated with the packing label do not match, the produce and packing label is marked for further review and/or rejection;

packing two or more items of produce into a container having a container label; the container label having a container digitally readable element to determine the required items of produce that should be located within the container;

reading all of the unique first digitally readable elements located within the container to obtain the information from the unique records associated with the unique first digitally readable elements;

reading the container digitally readable element to obtain information on the required items of produce that should be located within the container;

comparing the information from the unique records associated with the read unique first digitally readable elements and information of the required items of produce that should be located within the container to determine if the container contains the required items of produce; and rejecting the container if the container does not contain the required items of produce to complete packaging compliance.

2. The packaging compliance method of claim 1 wherein the first digitally readable element is an RFID tag.

3. The packaging compliance method of claim 2 wherein the RFID tag is a passive RFID tag.

4. The packaging compliance method of claim 1 wherein the packaging label includes a second digitally readable element.

5. The packaging compliance method of claim 4 wherein the second digitally readable element is unique.

6. The packaging compliance method of claim 5 wherein the second digitally readable element is a 2D barcode.

7. The packaging compliance method of claim 5 wherein the unique second digitally readable element is associated with a record in the database.

8. The packaging compliance method of claim 6 wherein the unique second digitally readable element is associated with the same unique record in the database as the unique first digitally readable element.

9. The packing compliance method of claim 5 wherein the unique first digitally readable element and the unique second digitally readable element are of different forms.

10. The packing compliance method of claim 1 wherein the unique code is a serial number.

11. The packing compliance method of claim 1 wherein the encoding device causes a unique record to be created in a database in a computer system that includes the unique code.

12. The packing compliance method of claim 1 wherein the unique record is uniquely based on the unique code.

13. The packing compliance method of claim 1 wherein the encoding device reads the unique code from the unique first digitally readable element.

14. The packing compliance method of claim 13 wherein a comparison of the read code of the first digitally readable element is compared to the unique code located within the unique record located within the database to determine if the encoding of the first digitally readable element was successful.

* * * * *